United States Patent
Dunn et al.

(10) Patent No.: US 9,897,299 B2
(45) Date of Patent: Feb. 20, 2018

(54) WEARABLE LIGHT ASSEMBLY AND METHOD FOR CONTROLLING SAME

(71) Applicant: B/E AEROSPACE, INC., Wellington, FL (US)

(72) Inventors: Matthew Dunn, Stony Brook, NY (US); Eric Johannessen, Holbrook, NY (US)

(73) Assignee: B/E Aerospace, Inc., Wellington, FL (US)

( * ) Notice: Subject to any disclaimer, the term of this patent is extended or adjusted under 35 U.S.C. 154(b) by 0 days.

(21) Appl. No.: 15/497,910

(22) Filed: Apr. 26, 2017

(65) Prior Publication Data

US 2017/0328548 A1 Nov. 16, 2017

Related U.S. Application Data

(60) Provisional application No. 62/336,382, filed on May 13, 2016.

(51) Int. Cl.

| | |
|---|---|
| *H05B 33/08* | (2006.01) |
| *H05B 37/02* | (2006.01) |
| *F21V 23/04* | (2006.01) |
| *F21V 7/00* | (2006.01) |
| *F21V 33/00* | (2006.01) |
| *F21L 4/02* | (2006.01) |
| *A41D 1/04* | (2006.01) |
| *A41D 1/00* | (2018.01) |
| *F21Y 115/10* | (2016.01) |

(52) U.S. Cl.
CPC .......... *F21V 23/0471* (2013.01); *A41D 1/002* (2013.01); *A41D 1/04* (2013.01); *F21L 4/02* (2013.01); *F21V 7/00* (2013.01); *F21V 33/0008* (2013.01); *H05B 33/0842* (2013.01); *F21Y 2115/10* (2016.08)

(58) Field of Classification Search
None
See application file for complete search history.

(56) References Cited

U.S. PATENT DOCUMENTS

| | | | |
|---|---|---|---|
| 2005/0134191 A1* | 6/2005 | Wong | A43B 1/0036 315/200 A |
| 2008/0130272 A1* | 6/2008 | Waters | G02C 11/04 362/106 |
| 2012/0143357 A1* | 6/2012 | Chemel | F21V 23/0471 700/90 |

* cited by examiner

*Primary Examiner* — Dedei K Hammond
(74) *Attorney, Agent, or Firm* — Drinker Biddle & Reath LLP

(57) ABSTRACT

A wearable light assembly includes an opaque housing that is open towards the ground and is configured to reflect light emitted from a first light source downward onto a first location that is close to the wearer and reflect light from a second light source downward onto a second location on the ground that is farther away from the wearer than the first location. In an embodiment, the wearable light assembly senses motion of the wearer and switches between the first light source and the second light source depending on whether the wearer is moving slowly (in which case it activates the first light source) or moving quickly (in which case it activates the second light source).

20 Claims, 4 Drawing Sheets

WEARABLE LIGHT ASSEMBLY AND METHOD FOR CONTROLLING SAME

CROSS-REFERENCE TO RELATED APPLICATIONS

This application claims the priority benefit of U.S. Provisional Patent Application 62/336,382 filed May 13, 2016 and incorporated herein by reference.

TECHNICAL FIELD

The disclosure relates generally to portable lighting units and, more particularly, to a wearable light assembly and method for controlling a wearable light assembly.

BACKGROUND

Moving around on foot during the hours of darkness or in other low-lighting situations is challenging in itself. Trying to do so in a situation where there are real or simulated human threats (such as military or law enforcement operations) is even more difficult. For example, it is awkward to carry a flashlight while holding a weapon. Clipping the flashlight to one's belt or load-carrying equipment straps provides a partial solution, but increases the risk of being spotted by a threat.

DRAWINGS

The features of the present techniques may be best understood from the following detailed description taken in conjunction with the accompanying drawings of which:

DESCRIPTION

According to various embodiments, a wearable light assembly includes an opaque housing that is open towards the ground and is configured to reflect light emitted from a first light source downward onto a first location that is close to the wearer and reflect light from a second light source downward onto a second location on the ground that is farther away from the wearer than the first location. In an embodiment, the wearable light assembly senses motion of the wearer and switches between the first light source and the second light source depending on whether the wearer is moving slowly (in which case it activates the first light source) or moving quickly (in which case it activates the second light source). The wearable light assembly may be worn on, for example, a wearer's chest or vest (e.g., military load-carrying equipment). If meant to be worn on a person's vest, the wearable light assembly could be considered a "vest light," with the combination of the light assembly and the vest being referred to as a "lighting vest." In addition to being used to see in front of the wearer, the wearable light assembly may also be used to read a map (e.g., either with white light in non-tactical situations or red light when light discipline is required). "Wearable" in the context of this disclosure refers to being wearable by a person.

Figure 1:
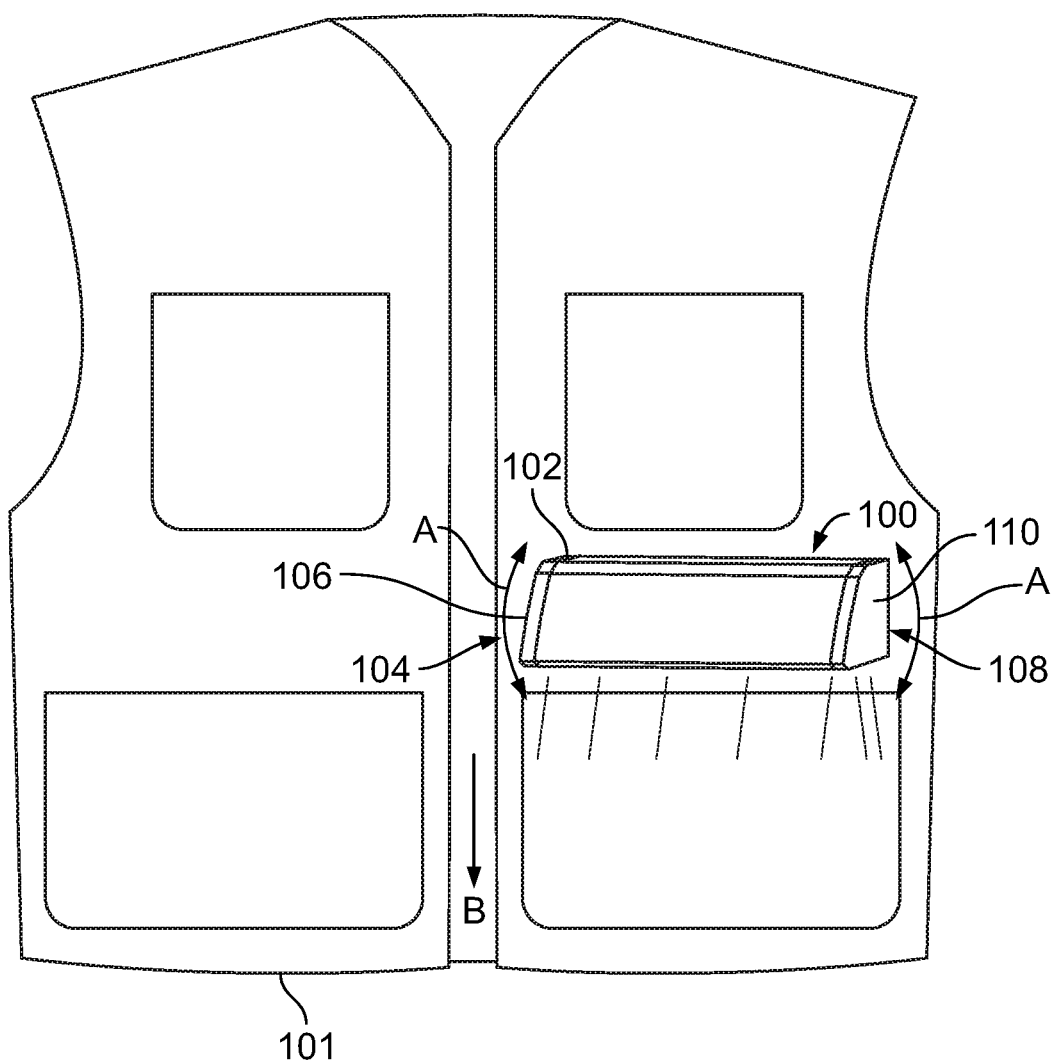
FIG. 1 is a perspective view of a wearable light assembly configured in accordance an embodiment.

Turning to FIG. 1, a wearable light assembly, generally labeled 100, includes a housing 102. In an embodiment, the housing 102 is made (at least in part) of a flexible material, such as silicone, so as to permit the housing 102 to flex in the directions indicated by arrows A. The housing 102 is opaque and non-reflective on its outer surface and may be, for example, black or a camouflaged pattern. As will be discussed in further detail, the wearable light assembly 100 is configured to cast light in a downward direction (indicated by arrow B) with respect to the wearer. Attached to a first end 104 of the housing 102 is a first end cap 106 (shown in more detail in FIG. 2). Attached to a second end 108 of the housing 102 is a second end cap 110. In an embodiment, the first end cap 106 and the second end cap 110 are each flexible, rugged, and dark-colored (e.g., black or camouflaged). The light assembly 100 is depicted as being attached to a vest 101. The vest 101 can be made of any of a variety of materials (e.g., nylon) and can include straps, zippers, and cables for securing the vest to the wearer and for securing the light assembly 100 to the vest 101.

Figure 2:
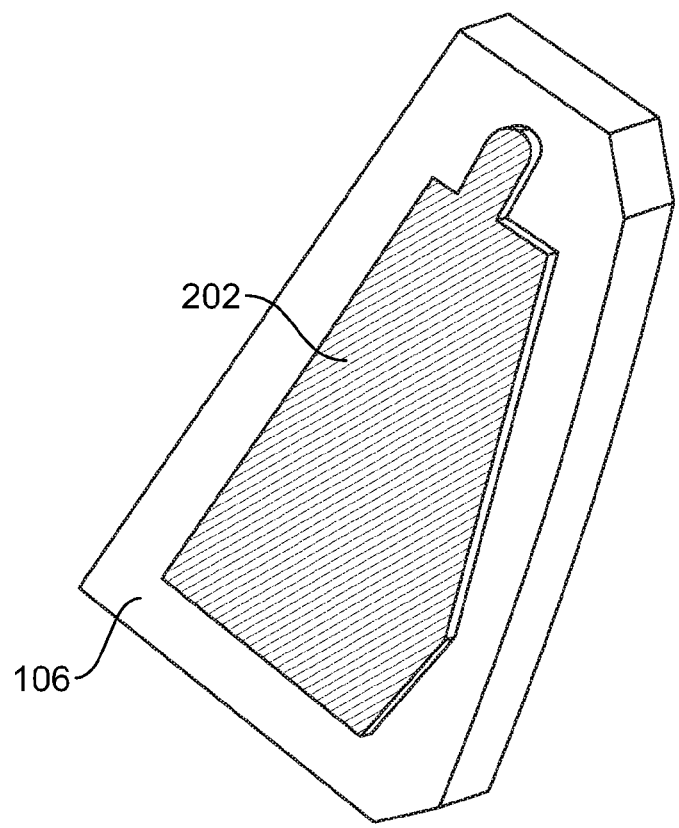
FIG. 2 is perspective view of an end cap, according to an embodiment.
Figure 3:
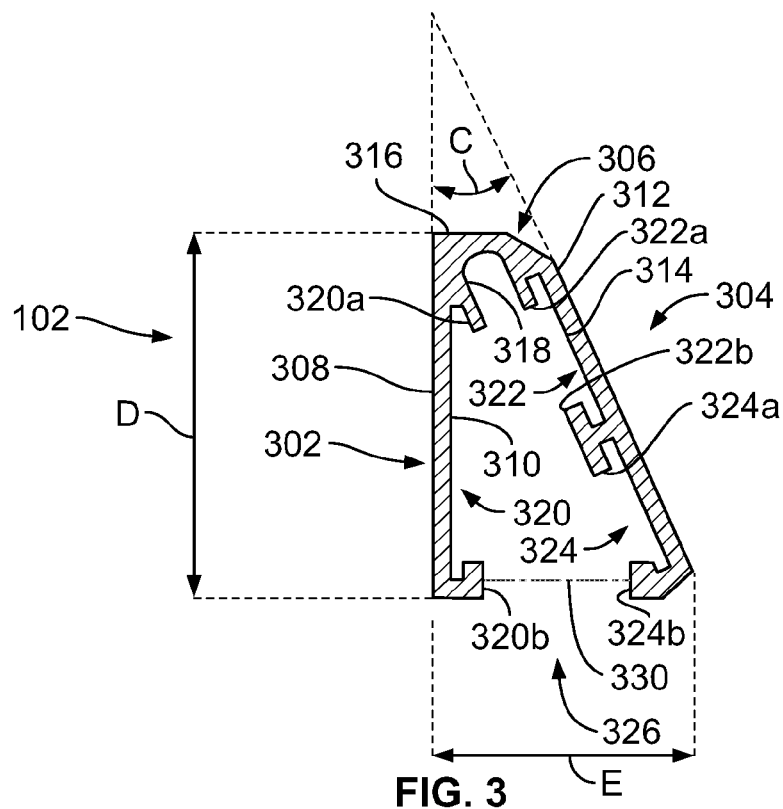
FIG. 3 is an elevated side view of the wearable light assembly of FIG. 1 without the end cap and without the reflector and light boards, according to an embodiment.

Turning to FIG. 2, in an embodiment, the first end cap 106 includes a control housing 202. The control housing 202 may include various components that are described in more detail in conjunction with FIG. 6.

In an embodiment, the housing 102 is a unitary body that includes a first side wall 302, a second side wall 304, and a top wall 306. The first side wall 302 has a substantially planar outer surface 308 and a substantially planar inner surface 310. The second side wall 304 has a substantially planar outer surface 312 and a substantially planar inner surface 314. The top wall 306 has an angled outer surface 316 and curved inner surface 318. The inner surface 310 of the first side wall 302 forms a slot 320 bounded by a first ledge 320a and a second ledge 320b. The slot 320 holds in place a reflector (shown in FIG. 4). Although a single reflector is shown, multiple reflectors are used in some embodiments. The inner surface 314 forms a first slot 322 (bounded by a first ledge 322a and a second ledge 322b) and a second slot 324 (bounded by a first ledge 324a and a second ledge 324b). The first slot 322 is configured to hold a first light board (shown in FIG. 4) and the second slot 324 is configured to hold a second light board (also shown in FIG. 4). The first side wall 302 and the second side wall 304 are disposed at an angle C with respect to one another and form an opening 326. Angle C may be optimized by using a ray trace. In one embodiment, angle C is at or about 35 degrees. The first side wall 302 has a height D (which, in one embodiment, is at or about 1 inch). The distance E between the outer surface 308 of the first side wall 302 and the outer surface 312 of the second side wall 304 at the opening 326 is depends on the angle C and the height D. The inner surfaces 310, 314, and 318 form a cavity 328, which is filled with a clear silicone gel 330 up to the opening 326. The housing 102 may be hermetically sealed.

Figure 4:
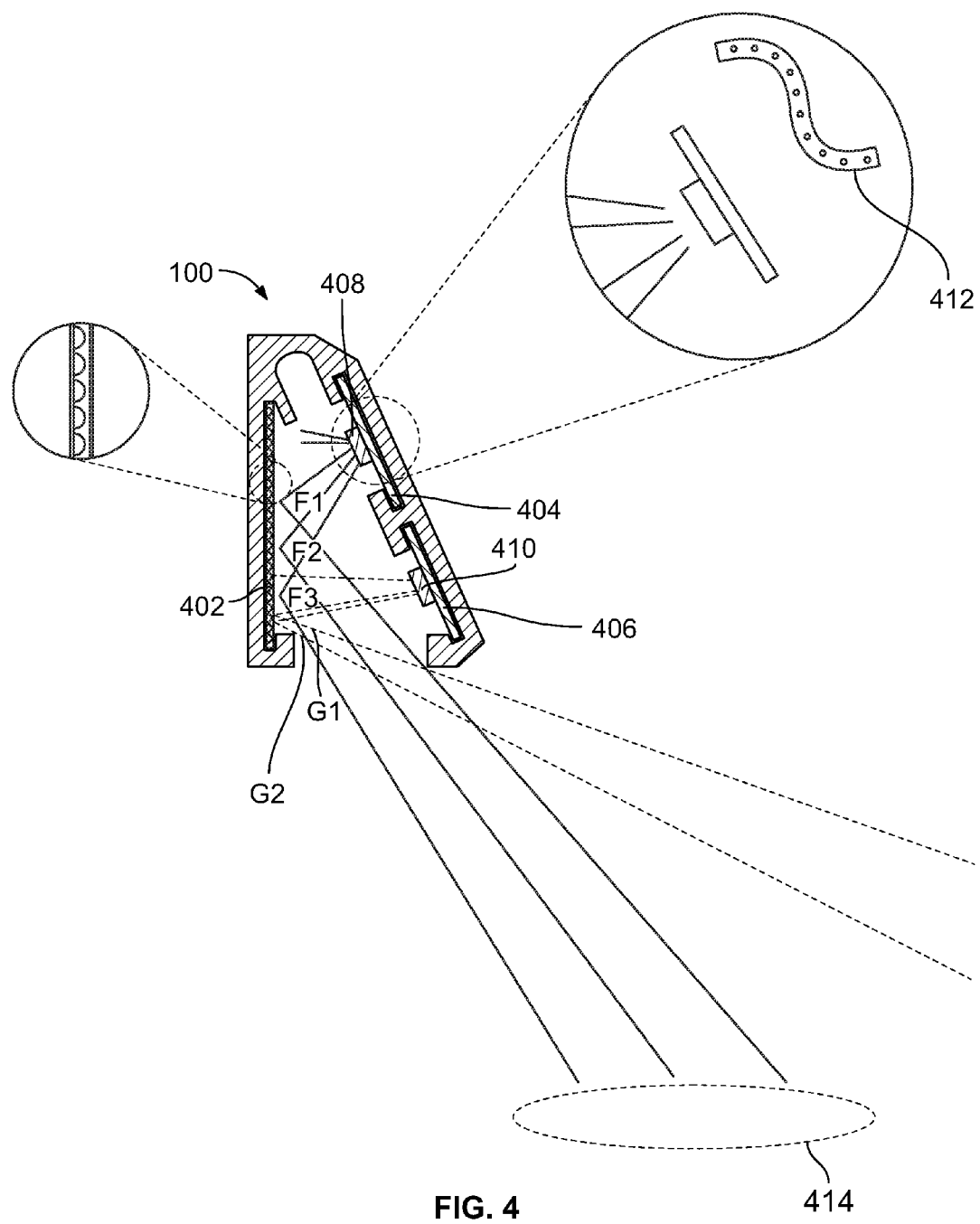
FIG. 4 is an elevated side view of the wearable light assembly of FIG. 1 without the end cap but with the reflector and light boards, according to an embodiment.

Turning to FIG. 4, in an embodiment, the wearable light assembly 100 includes a reflector 402, depicted in FIG. 4 as a reflector board, which is disposed within the slot 320 of the first side wall 302; a first light board 404, which is disposed in the first slot 322 of the second side wall 304; and a second light board 406, which is disposed in the second slot 324 of the second wall 304. The wearable light assembly 100 also includes a first set 408 of lights (disposed within the first slot 322 and attached to the first light board 404) and a second set 410 of lights (disposed within the second slot 324 and attached to the second light board 406). Each of the first set 408 and second set 410 may include any number of lights (including as few as a single light per set), and each set may be referred to herein as a "light source." In an embodiment, the lights in either or both the first set 408 and the second set 410 are light-emitting diodes (LEDs). In another embodiment, instead of light boards and lights, one or both of the slots 322 and 324 may be occupied by a flexible light 412, which includes one or more lights (such as LED lights) integrated with a flexible material (such as silicone).

Figure 5:
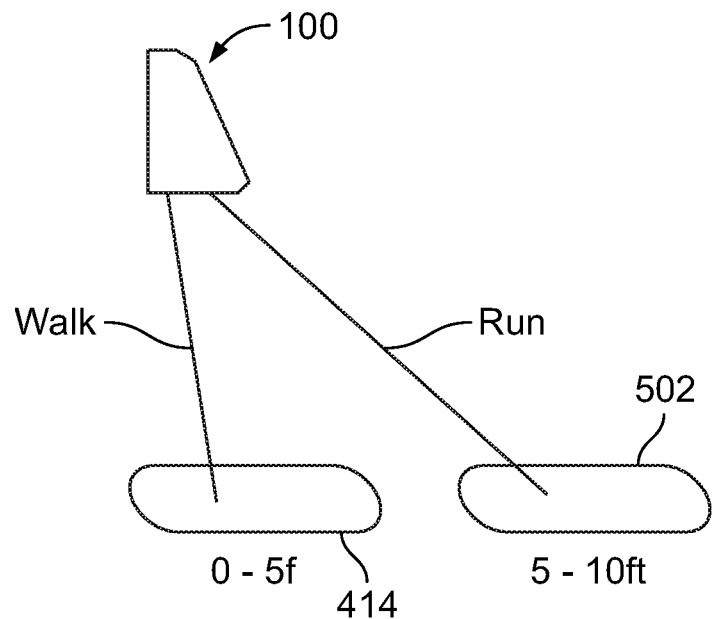
FIG. 5 illustrates two modes of operation of the wearable light assembly, according to an embodiment.

According to an embodiment, the first set 408 of lights is configured to cast light on the reflector 402 and reflect the light at a number of angles that ranges from a first angle F1 to a second angle F3, and includes an intermediate angle F2. The angle range F1 to F3 may be selected so that the light emitted from the first set 408 of lights reflects off of the reflector 402 and onto the ground near the wearer (location 414). Similarly, the second set 410 of lights is configured to cast light on the reflector 402 and reflect the light at a number of angles that ranges from a first angle G1 to a second angle G2. The angle range G1 to G2 may be selected so that the light emitted from the second set 410 of lights reflects off of the reflector 402 and onto the ground farther away from the wearer than that of the first set 408 (location 502, shown in FIG. 5). Also, in an embodiment, the color of the first set 408 and/or the second set 410 of lights may be selected by the wearer via an input device (e.g., a switch). For example, one or both sets of lights may be switchable between white (for normal, non-tactical operations) and red or infrared (for nighttime, tactical operations). According to an embodiment, the first set 408 of lights emits light that is dimmer than that emitted by the second set 410 of lights.

In an embodiment, the wearable light assembly 100 switches between illuminating with the first set 408 of lights and the second set 410 of lights either by user selection (e.g., via switch) or by sensing motion (e.g., using an accelerometer). For example, referring to FIG. 5, if the wearable light assembly 100 senses that the user is moving slowly or standing still, then the wearable light assembly 100 may have the first set 408 of lights turned on and the second set 410 of lights turned off, so that the light emitted from the wearable light assembly 100 is cast on the first location 414 (e.g., on the ground from 0 to 5 feet in front of the wearer). If the wearable light assembly 100 senses that the user is moving quickly (e.g., as if running), then the wearable light assembly 100 may have the first set 408 of lights turned off and the second set 410 of lights turned on, so that the light emitted from the wearable light assembly 100 is cast on the second location 502 (e.g., on the ground from 5 to 10 feet in front of the wearer).

Figure 6:
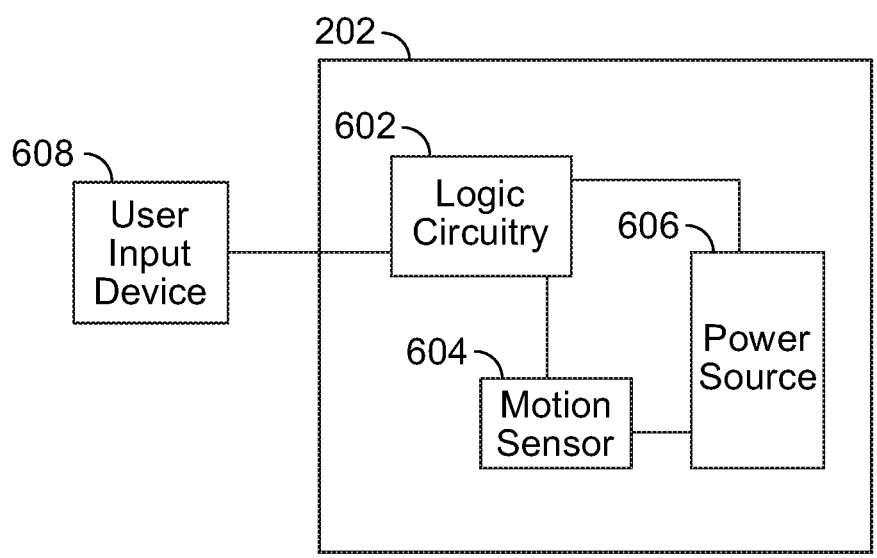
FIG. 6 illustrates electrical components that may be used to operate the wearable light assembly, according to an embodiment.

Turning to FIG. 6, the control housing 202 in an embodiment includes logic circuitry 602 (e.g., a microprocessor, a controller, an application-specific integrated circuit, or field-programmable gate array) that executes instructions for carrying out the various operations of the wearable light assembly 100, a motion sensor 604 (e.g., an accelerometer or gyroscope) that senses the motion and/or orientation of the wearable light assembly 100 and provides data regarding the sensed motion and/or orientation to the logic circuitry, and a power source 606, which provides power to the logic circuitry 602, motion sensor 604, and light sets 408 and 410. In an embodiment, the power source 606 is a battery. In another embodiment, the power source 606 is a high-capacity capacitor (such as a so-called supercapacitor or ultracapacitor). Though not shown, the logic circuitry 602 and power source 606 are electrically coupled to the first and second light sets 408 and 410. A user input device 608 (e.g., a switch or button) is coupled to the logic circuitry 502.

To carry out a method for controlling the wearable light assembly 100, the logic circuitry 602 may carry out the following operations. 1) detect user input from the user input device 608, 2) if the user input indicates that the wearable light assembly 100 should be in a particular mode (either near field or far field) then transmit signals to the appropriate set of lights in order to put the wearable light assembly in that selected mode, 3) if the user input indicates that the wearable light assembly 100 should be in an auto-select mode, then the logic circuitry 602 reads motion data from the motion sensor 604 and, if the motion data indicates that the wearer is standing still or walking, then active the first set 408 of lights, but if the motion data indicates that the wearer is running, activate the second set 410 of lights.

It should be understood that the exemplary embodiments described herein should be considered in a descriptive sense only and not for purposes of limitation. Descriptions of features or aspects within each embodiment should typically be considered as available for other similar features or aspects in other embodiments. It will be understood by those of ordinary skill in the art that various changes in form and details may be made therein without departing from their spirit and scope as set forth in the following claims. For example, the actions described herein can be reordered in ways that will be apparent to those of skill in the art.

What is claimed is:

1. A wearable light assembly comprising:
a housing having an opening that faces towards the ground when the light assembly is worn by a person;
a first light source disposed within the housing,
a second light source disposed within the housing
wherein, the housing is configured to:
reflect light emitted from the first light source downward onto a first location on the ground,
reflect light from the second light source downward onto a second location on the ground that is farther away from the person than the first location; and
logic circuitry configured to activate the first light source and the second light source.

2. The light assembly of claim 1, wherein
the housing comprises a first side wall and a second side wall facing one another at an angle,
the first light source and the second light source are disposed on the first side wall,
the light assembly further comprises one or more reflectors disposed on the first side wall, and
the first light source and the second light source are positioned so that light emitted from the first light source reflects off of the one or more reflectors and strikes the ground at a first location and light emitted from the second light source reflects off of the one or more reflectors and strikes the ground at a second location that is farther away from the person than the first location.

3. The light assembly of claim 2, wherein the one or more reflectors comprises a reflector board disposed on the first side wall.

4. The light assembly of claim 2, wherein
a slot bounded by a first ledge and a second ledge is disposed on an inner surface of the first side wall, and
the one or more reflectors comprise a reflector board held within the slot.

5. The light assembly of claim 2, wherein
a first slot bounded by a first ledge and a second ledge is disposed on an inner surface of the second side wall,
a second slot bounded by a first ledge and a second ledge is disposed on the inner surface of the second side wall,
the first light source is held within the first slot, and
the second light source is held within the second slot.

6. The light assembly of claim 2, wherein
the housing further comprises a top wall that is connected to the first side wall and the second side wall,
an inner surface of the top wall, an inner surface of the first side wall, and an inner surface of the second side wall form a cavity, and
the cavity is filled with a clear silicone gel.

7. The light assembly of claim 1, wherein the logic circuitry is further configured to receive a user input and, in response to the user input, turn off the first light source and turn on the second light source or vice versa.

8. The light assembly of claim 1, further comprising a motion sensor that detects motion of the light assembly, generates motion data based on the detected motion, and provides the motion data to the logic circuitry, wherein the logic circuitry is further configured to:
if the motion data indicates that the person wearing the assembly is walking or standing, turn on the first light but keep the second light off; and
if the motion data indicates that the person wearing the assembly is running, turn on the second light but keep the first light off.

9. The light assembly of claim 1, wherein the housing is made of a flexible material so as to permit the housing to flex.

10. The light assembly of claim 1, wherein the housing is opaque.

11. The light assembly of claim 1, wherein the first light source emits light that is dimmer than the light emitted by the second light source.

12. The light assembly of claim 1, wherein the first light source comprises a first plurality of light-emitting diode lights and the second light source comprises a second plurality of light-emitting diode lights.

13. The light assembly of claim 1, further comprising a first end cap that is attached to and seals a first end of the housing and a second end cap that is attached to and seals a second end of the housing.

14. The light assembly of claim 13, wherein the logic circuitry is contained within the second end cap.

15. The light assembly of claim 14, further comprising a power source that is contained within the second end cap, wherein the power source provides power to the logic circuitry, the first light source, and the second light source.

16. The light assembly of claim 15, wherein the power source comprises a high-capacity capacitor.

17. A lighting vest comprising
a vest;
a housing attached to the vest, the housing comprising a first side wall and a second side wall;
a first light source disposed on the second side wall;
a second light source disposed on the second side wall and offset from the first light source;
wherein the first side wall and second side wall face one another at an angle such that
light emitted from the first light source reflects off of the one or more reflectors on the first side wall and illuminates a first location on the ground,
light emitted from the second light source reflects off of the one or more reflectors on the first side wall and illuminates a second location on the ground, wherein the second location is farther away from the person than the first location;
a motion sensor; and
logic circuitry electrically connected to the motion sensor and configured to
receive user input to activate the first light source or the second light source,
operate in an auto-select mode in which the logic circuitry activates the first light source or second light source based on motion data received from motion center.

18. The lighting vest of claim 17, wherein, in the auto-select mode, the logic circuitry switches between the first light source and the second light source based on whether the motion data indicates the wearer is moving slowly or moving quickly.

19. A method for controlling the lighting of a wearable light assembly, the method comprising:
detecting the motion of the light assembly;
if the detected motion indicates that a person wearing the light assembly is standing or walking, turning on a first light source that is configured to emit light onto a first location on the ground in front of the person;
if the detected motion indicates that a person wearing the light assembly is running, turning on a second light source that is configured to emit light onto a second location on the ground in front of the person and further away from the person than the light of the first light source.

20. The method of claim 19, wherein the first location is between about zero feet and about five feet in front of the wearer, and the second location is between about five feet and about ten feet in front of the wearer.

* * * * *